United States Patent
Miller

(10) Patent No.: US 6,702,586 B1
(45) Date of Patent: Mar. 9, 2004

(54) TEACHING PUZZLE

(75) Inventor: Sharon A. Miller, Lawrence, KS (US)

(73) Assignee: Sharmac Designs LLC, Overland Park, KS (US)

( * ) Notice: Subject to any disclaimer, the term of this patent is extended or adjusted under 35 U.S.C. 154(b) by 0 days.

(21) Appl. No.: 10/313,428

(22) Filed: Dec. 6, 2002

(51) Int. Cl.⁷ .............................................. G09B 25/00
(52) U.S. Cl. .................................. 434/406; 273/157 R
(58) Field of Search ..................... 434/406; 273/153 R, 273/156, 157 R; 281/3.1, 15.1, 38, 51

(56) References Cited

U.S. PATENT DOCUMENTS

| | | |
|---|---|---|
| 279,268 A | 6/1883 | Norris |
| 1,359,115 A * | 11/1920 | Sittinger |
| 1,624,450 A | 4/1927 | Vershbinsky |
| 1,735,456 A | 11/1929 | Garman |
| 3,333,351 A | 8/1967 | Williams |
| 3,491,196 A | 1/1970 | Stein |
| 3,653,668 A | 4/1972 | Santianni |
| 3,815,920 A * | 6/1974 | Carter et al. ............ 273/157 R |
| 3,937,472 A | 2/1976 | Rice |
| 4,379,555 A | 4/1983 | Dean |
| 4,640,512 A | 2/1987 | Burke |
| 4,756,533 A | 7/1988 | Hopkins et al. ............ 434/178 |
| 5,049,078 A * | 9/1991 | Thomsen ..................... 434/178 |
| 5,149,098 A * | 9/1992 | Bianchi .................... 273/157 R |
| 5,213,507 A * | 5/1993 | Ozrovitz ..................... 434/178 |
| 5,439,220 A * | 8/1995 | Hendricks ................... 273/155 |
| 5,743,741 A | 4/1998 | Fife |

FOREIGN PATENT DOCUMENTS

| | | |
|---|---|---|
| GB | 2058584 A | 4/1981 |
| GB | 2063078 | * 6/1981 |

* cited by examiner

Primary Examiner—Jacob K. Ackun
Assistant Examiner—Jamila Williams
(74) Attorney, Agent, or Firm—Marcia J. Rodgers; Shughart Thomson & Kilroy P.C.

(57) ABSTRACT

A teaching puzzle comprises a book in combination with a game board. The book includes a plurality of pages, each page having a written passage printed thereon and a respective puzzle piece removably attached thereto. Each puzzle piece has front and back sides with a respective first indicia on the back side related to the written passage. The game board has a display area with a piece receiving portion for each puzzle piece demarcated thereon, each piece receiving portion being marked with the same first indicia as the back side of the respective puzzle piece.

19 Claims, 3 Drawing Sheets

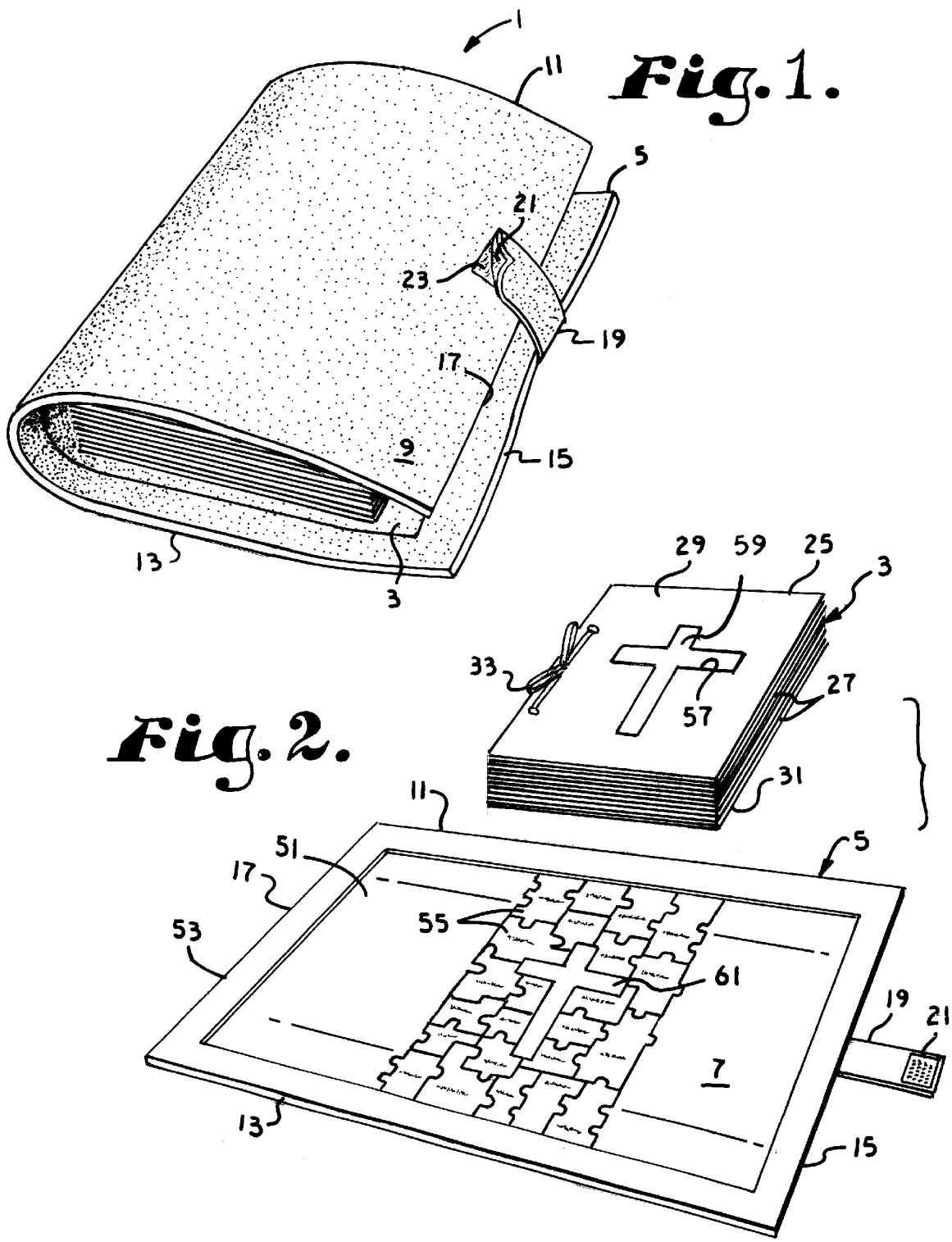

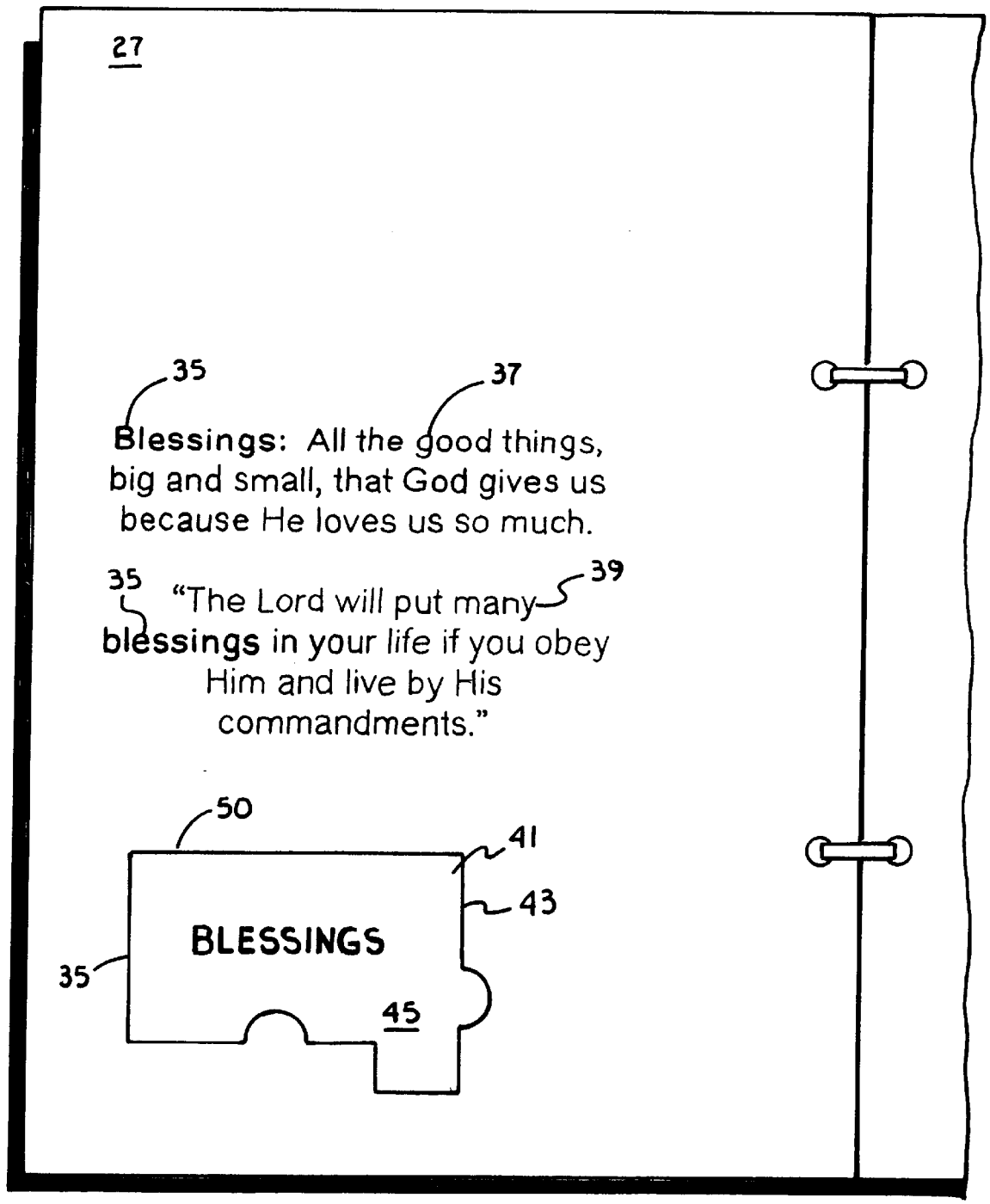

TEACHING PUZZLE

BACKGROUND OF THE INVENTION

1. Field of the Invention

The present invention relates to teaching aids, and in particular to a puzzle which is useful in helping a student to memorize written passages and supplemental information associated therewith.

2. Description of the Related Art

Jigsaw puzzles are well known in the toy and hobby arts. These puzzles generally consist of a flat puzzle body which is cut into a plurality of uniquely shaped and selectively interlocking puzzle pieces. The top face of the puzzle body includes a photograph, design or other pictorial image. The object of the puzzle is to assemble the puzzle body from the individual puzzle pieces using the pictorial image as a guide.

U.S. Pat. No. 4,756,533 to Hopkins et al. discloses a variation on the jigsaw puzzle for use in a lottery game. The game includes a puzzle board having multiple pictorial images with demarcations showing where individual puzzle pieces are to be placed. The game further includes a set of lottery tickets which are individually purchased by a player. Each ticket has a plurality of puzzle pieces removably attached thereto which are each to be placed on the puzzle board over one of the pictorial images. Each puzzle piece has a front face which is printed with a portion of one of the pictorial images. By matching the images, the player can determine which pictorial image each puzzle piece corresponds to and where to place each piece on the respective pictorial image. The player wins a prize when one or more of the pictorial images is completely covered by the correct puzzle pieces.

U.S. Pat. No. 4,640,512 to Burke discloses a puzzle used in combination with a story book. Each page of the story book includes text and a respective illustration. Each piece of the puzzle has a duplicate of a respective illustration from the book printed on one side and a portion of a pictorial image on the other side. The puzzle pieces interlock consecutively in the order in which the illustrations appear in the book to complete the pictorial image.

Puzzles of the jigsaw type, i.e. puzzles with flat interlocking pieces, have also been designed for educational purposes. U.S. Pat. No. 3,333,351 to Williams discloses a puzzle with interlocking pieces for teaching sentence structure. Each piece has a word printed thereon and is shaped such that the pieces can only be connected to form a sentence when correct sentence structure is used. U.S. Pat. No. 5,743,741 discloses a math puzzle. The puzzle pieces include a beginning piece having a portion of at least one mathematical expression printed thereon. Each adjoining piece extends the expression started on the beginning piece.

SUMMARY OF THE INVENTION

The present invention is a teaching puzzle designed to help a student memorize written passages and relationships between the written passage and supplemental information relating to that passage. For example, the puzzle can be used to help a student memorize bible verses, the broad concepts to which certain verses relate, and the chapter and verse designations of those verses.

The puzzle includes a book and a game board which are used in combination. Each page of the book deals with a particular subject and is printed with a passage which relates to that subject. A keyword identifying the relevant subject is highlighted in the passage. The page may also include a definition of the keyword. Removably attached to each page is a respective puzzle piece. Each puzzle piece has the respective keyword printed on its front side. A respective piece of supplemental information significant to the passage is printed on the back side of the puzzle piece.

The game board has a display area sized to receive the assembled puzzle. The display area is divided into a plurality of piece receiving portions, each of which corresponds to one of the puzzle pieces. Each piece receiving portion is marked with the same supplemental information as the back side of the respective puzzle piece.

In use, the student reads a passage with emphasis on the keyword. The student will then attempt to memorize the passage and the keyword to which it relates. The student will then remove the respective puzzle piece from the page. In doing so, the student will examine the keyword on the front side of the piece and the supplemental information on the back side of the piece. The student then looks for the piece receiving portion of the display area which bears the same supplemental information as the puzzle piece. This reinforces the connection between the keyword and the supplemental information. The student then places the piece on the board over the respective piece receiving portion.

It is intended that by repeated use of the teaching puzzle, the student will memorize the passages, learn which passages relate to which subjects, and be able to identify the passage by its supplemental information.

BRIEF DESCRIPTION OF THE DRAWINGS

FIG. 1 is a perspective view of a teaching puzzle according to the present invention with a game board thereof closed around a book which along with the game board comprises the puzzle.

FIG. 2 is a perspective view of the teaching puzzle of FIG. 1 with the game board unfolded from around the book.

FIG. 3 is an enlarged plan view of a single page of the book and a puzzle piece removably attached thereto.

DETAILED DESCRIPTION OF THE PREFERRED EMBODIMENT

Figure 7:
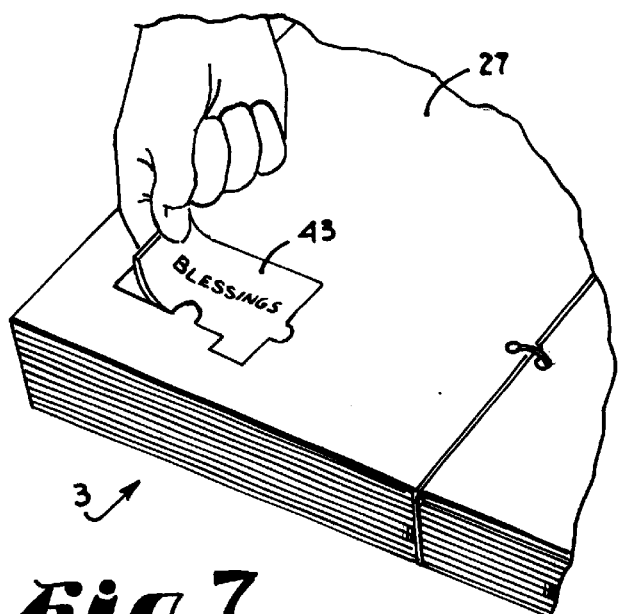
FIG. 7 is a fragmentary perspective view of the book showing the puzzle piece being removed from the page of FIG. 3.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, and in particular to FIGS. 1 and 2, the reference number 1 generally designates a teaching puzzle embodying the present invention. The puzzle 1 will be disclosed herein as being a puzzle for teaching verses of the Bible, however it is to be understood that the puzzle 1 can be adapted for teaching a wide variety of other subjects. The puzzle 1 generally comprises a book 3 which is used in combination with a game board 5.

The game board 5 is preferably formed of a soft, flexible material, such as foam, which can be folded around the book 3 to act as a holder for the book 3, as shown in FIG. 1. The game board 5 includes a front surface 7, a back surface 9, a top edge 11, a bottom edge 13 and opposed side edges 15 and 17, respectively. A fastening strap 19 is secured to the back surface 9 of the board 5 proximate one of the side edges 15 and 17. The strap 19 includes a pad of hook-and-loop material 21 which is engageable with a mating pad of hook-and-loop material 23 secured to the back surface 9 of the board 5 proximate the other of the side edges 15 and 17. The strap 19 acts to secure the side edges 15 and 17 of the game board 5 to one another when the board 5 is folded around the book 3.

The book 3 includes a cover 25 and a plurality of pages 27 bound within the cover 25. The cover 25 includes a front cover board 29 and a rear cover board 31. The pages 27 are preferably removably bound within the cover 25 such that they can be used individually as flash cards. For example, the pages 27 may be removably bound within the cover 25 by a ribbon 33.

Each page 27 of the book 3 is devoted to a particular subject, and each subject has a keyword 35 associated with it. For example, FIG. 3 shows a page 27 of the book 3 dealing with the subject of blessings, and the keyword 35 associated therewith is "Blessings."

Printed upon each page is the respective keyword 35, along with a definition 37 of the keyword 35. Also printed on each page are one or more verses 39, or portions of verses 39, from the Bible which deal with the respective subject. The verses 39 each contain the keyword 35, which is bolded, highlighted or otherwise emphasized in the respective printed verses 39.

Figure 4:
FIG. 4 is an enlarged plan view of the front of the puzzle piece of FIG. 3.
Figure 5:
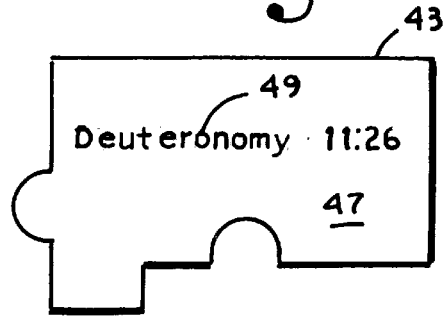
FIG. 5 is an enlarged plan view of the rear of the puzzle piece of FIGS. 3 and 4.

The pages 27 of the book 3 each are relatively thick, and includes a respective cut-out 41 shaped to receive a respective puzzle piece 43. The puzzle pieces 43 are each removably retained within the respective cut-out 41 by a friction fit. Each puzzle piece 43 has a unique shape and, when the puzzle pieces 43 are removed from the book 3, they interlock to form a single contiguous puzzle body. As shown in FIGS. 4 and 5, each puzzle piece 43 has a front side 45 and a back side 47. Printed on the front side of each piece 43 is the keyword 35 from the respective page 27 of the book 3. Printed on the back side of each piece 43 are chapter and verse designations 49 indicating where the respective verses 39 can be located in the Bible. The front side 45 of each piece may be covered in a reflective material 50 so that a student assembling the puzzle body can see a complete reflection of themselves when the puzzle body is completed.

Figure 6:
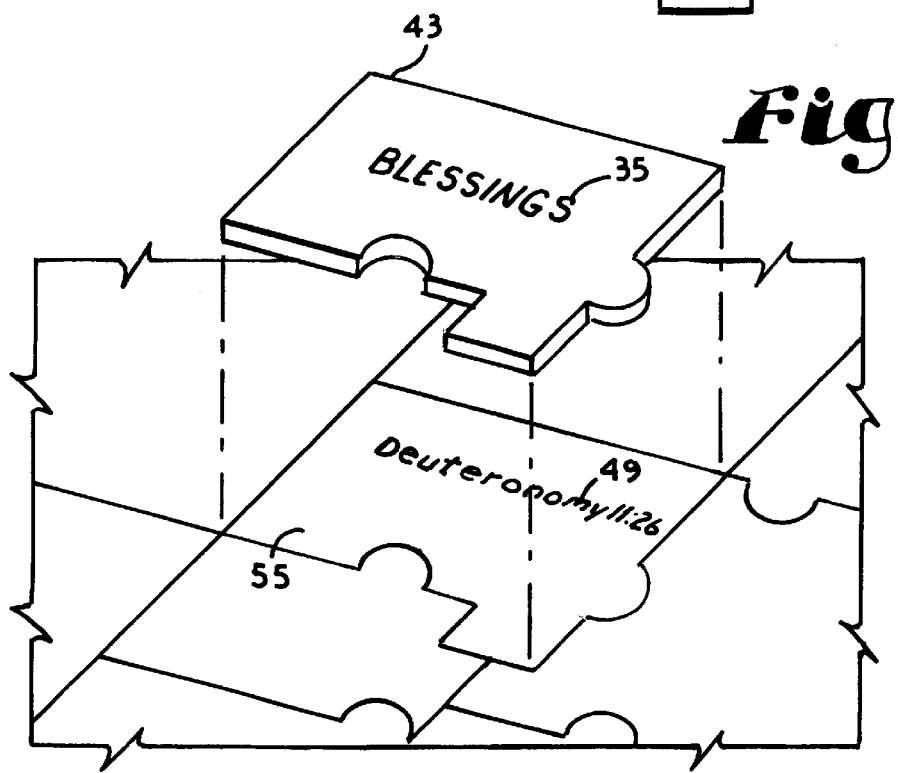
FIG. 6 is a fragmentary perspective view showing how the puzzle piece of FIGS. 3–5 is placed onto the game board.

Referring again to FIG. 2, the game board 5 includes a display area 51 on the front surface 7 sized to receive the assembled puzzle body. The display area 51 may be surrounded by a raised frame 53. The display area 51 is divided into a plurality of individual piece receiving portions 55, the borders of which are demarcated on the game board 5. As shown in FIG. 6, each piece receiving portion 55 is shaped to correspond to a respective puzzle piece 43 and is labeled with the same chapter and verse designations 49 as are printed on the back side 47 of the respective puzzle piece 43.

As seen in FIG. 2, the front cover board 29 of the book 3 may also include a cut-out 57 which receives a puzzle piece 59 which may be designated as a "completion piece". The completion piece 59 also forms a part of the puzzle body. The display area 51 includes a completion piece receiving portion 61 sized and shaped to receive the completion piece 59. The completion piece 59 may have a shape of special significance to the subject being taught (such as the shape of a cross for the biblical theme depicted herein).

In use, a student turns to a page 27 of the book 3 and reads the text displayed thereon, including the keyword 35, definition 37, and verses 39. The student will then attempt to memorize the verses 39 and how they relate to the keyword 35. The student will then remove the respective puzzle piece 43 from the cut-out 41 in the respective page 27, as shown in FIG. 7. The student will examine the keyword 35 on the front side 45 of the piece 43 and the chapter and verse designations 49 on the back side 47 of the piece 43. The student thus learns which chapters and verses of the Bible deal with which subjects. The student then looks for the piece receiving portion 61 of the display area 51 which bears the same chapter and verse designations 49 as the piece 43. This reinforces the connection between the keyword 35 and the chapter and verse designations 49. The student then places the piece 43 on the board 5 over the respective piece receiving portion 55, as shown in FIG. 6.

The above process is repeated for each page 27 of the book 3. After the last puzzle piece 43 is placed on the board 5, the student removes the completion piece 59 from the front cover board 29 of the book 3 and places it in the completion piece receiving portion 61, completing the puzzle body. The student can then see his or her reflection in the reflective material 50, along with the printed keywords 35, providing an inspirational effect.

It is intended that by repeated use of the teaching puzzle 1, the student will memorize the bible verses 39, their locations in the Bible as indicated by their chapter and verse designations 49, and be able to relate those verses to their subject matter as indicated by their respective keywords 35.

It is to be understood that while certain forms of the present invention have been illustrated and described herein, it is not to be limited to the specific forms or arrangement of parts described and shown. For example, the biblical theme of the teaching puzzle 1 disclosed herein is not intended to be limiting. Puzzles according to the present invention could be used for teaching other subjects, such as history or literature. In these other applications, the supplemental information printed on the game board and the back of the puzzle piece could be the name of an author, the title of the work from which the printed passage is taken, a date, or any other information which is significant to the passage.

What is claimed and desired to be secured by Letters Patent is as follows:

1. A teaching puzzle comprising a book in combination with a game board, wherein said book includes a plurality of pages, each said page having a respective puzzle piece removably attached thereto, each said puzzle piece having front and back sides with a respective first indicia on said back side, said game board having a display area with a piece receiving portion for each said puzzle piece demarcated thereon, each said piece receiving portion being marked with the same first indica as the back side of the respective puzzle piece.

2. The teaching puzzle as in claim 1 wherein each said page of said book further includes a written passage identifiable by the respective first indicia.

3. The teaching puzzle as in claim 2 wherein each said written passage pertains to a respective subject and each said subject is represented by a second indicia marked on said front side of the respective puzzle piece.

4. The teaching puzzle as in claim 3 wherein each said second indicia is a keyword from the respective passage.

5. The teaching puzzle as in claim 4 wherein each said page further includes a definition of the respective keyword.

6. The teaching puzzle as in claim 1 wherein said front side of each said puzzle piece includes a reflective surface, said reflective surface allowing a person to see his or her reflection upon completion of the puzzle.

7. The teaching puzzle as in claim 1 wherein said book includes a front cover board and said front cover board has a specialized puzzle piece removably attached thereto.

8. The teaching puzzle as in claim 7 wherein said specialized puzzle piece is a completion piece designed to be the last puzzle piece placed on said game board.

9. The teaching puzzle as in claim 8 wherein said completion piece has a shape significant to subject matter being taught by said puzzle.

10. The teaching puzzle as in claim 1 wherein said game board is formed of a flexible material which can be folded around said book.

11. The teaching puzzle as in claim 10 wherein said game board has opposed edges and means for releasably connecting said opposed edges together when said game board is folded around said book.

12. A teaching puzzle for teaching bible verses, comprising:

a. a book having a plurality of pages, each said page having a respective puzzle piece removably attached thereto, each said puzzle piece having front and back sides, each said page having printed thereon a bible verse containing a keyword, said puzzle piece having said keyword displayed on said front side and a chapter and verse designation for said bible verse on said back side; and b. a game board having a display area with a piece receiving portion for each said puzzle piece demarcated thereon, each said piece receiving portion being marked with the same chapter and verse designation as the back side of the respective puzzle piece.

13. The teaching puzzle as in claim 12 wherein said front side of each said puzzle piece includes a reflective surface, said reflective surface allowing a person to see his or her reflection upon completion of the puzzle.

14. The teaching puzzle as in claim 12 wherein said book includes a front cover board and said front cover board has a specialized puzzle piece removably attached thereto.

15. The teaching puzzle as in claim 14 wherein said specialized puzzle piece is a completion piece designed to be the last puzzle piece placed on said game board.

16. The teaching puzzle as in claim 15 wherein said completion piece is in the shape of a cross.

17. The teaching puzzle as in claim 12 wherein said game board is formed of a flexible material which can be folded around said book.

18. The teaching puzzle as in claim 17 wherein said game board has opposed edges and means for releasably connecting said opposed edges together when said game board is folded around said book.

19. A teaching puzzle comprising a book in combination with a game board wherein said book includes a plurality of pages, each said page having a respective puzzle piece removably attached thereto, said game board having a display area sized to receive said puzzle pieces and being formed of a flexible material which can be folded around said book, and said game board has opposed edges and means for releasably connecting said opposed edges together when said game board is folded around said book.

* * * * *